United States Patent [19]

Schwartz

[11] Patent Number: 5,194,155

[45] Date of Patent: Mar. 16, 1993

[54] CONCENTRIC DUAL DRIVE SYSTEM FOR A FLOCCULATING CLARIFIER

[75] Inventor: Robert E. Schwartz, Montgomery, Ill.

[73] Assignee: McNish Corporation, West Chicago, Ill.

[21] Appl. No.: 541,049

[22] Filed: Jun. 20, 1990

[51] Int. Cl.$^5$ .............................................. B01D 21/20
[52] U.S. Cl. .................................. 210/519; 210/528; 210/541
[58] Field of Search ............... 210/519, 520, 528, 529, 210/531, 541, 525

[56] References Cited

U.S. PATENT DOCUMENTS

| | | | |
|---|---|---|---|
| 2,080,137 | 5/1937 | Keefer | 210/528 |
| 2,775,556 | 12/1956 | Kelly et al. | 210/528 |
| 2,783,891 | 3/1957 | Kunz et al. | 210/531 |
| 3,487,017 | 12/1969 | Thorn et al. | 210/525 |

FOREIGN PATENT DOCUMENTS 1015411 9/1957 Fed. Rep. of Germany.

OTHER PUBLICATIONS

D-17391, Schwartz, "General Arrangement-Sectional Elevation 62'-O" Dia Clarifier-Type 'FC2S', Mar. 6, 1979.
D-18975, Schwartz, "General Assembly 62'-O" Dia Clarifier-Type 'FC2S', Aug. 21, 1979.
D-17334, Schwartz, "Assembly Clarifier Drive Model HS 48-8.00", Mar. 1, 1979.
D-17313, Schwartz, "Drive Assembly Model 26DV", Feb. 21, 1979.
A-18947, Schwartz, "Assembly Detail Drive, Bridge & Cage Mounting (26DV)", Aug. 21, 1979.
A-18948, Schwartz, "Assembly Detail Drive, Bridge & Cage Mounting (HS48-8.00 & 9.25)", Aug. 21, 1979.
"Final Clarifiers", Copyright, 1988, Bonestroo, Rosene, Anderlik & Associates, Inc.

Primary Examiner—Wilbur Bascomb, Jr.
Assistant Examiner—Christopher Upton
Attorney, Agent, or Firm—Willian Brinks Olds Hofer Gilson & Lione

[57] ABSTRACT

A clarifier having a flocculating well is provided with two concentric drive cages: an outer drive cage that drives flocculation blades in rotation, and an inner drive cage that drives sludge collection arms across the base of the clarifier. Each drive cage is connected to a respective annular output gear, and each output gear is driven by a respective drive gear. The output gears are stacked one above the other, and each of the drive gears is connected to a respective speed reduction unit situated above the upper of the two output gears. The drive gear for the lower output gear is connected to the respective speed reduction unit by a drive shaft which passes through the upper output gear. Each of the speed reduction units is driven by a respective motor.

5 Claims, 4 Drawing Sheets

CONCENTRIC DUAL DRIVE SYSTEM FOR A FLOCCULATING CLARIFIER

BACKGROUND OF THE INVENTION

This invention relates to a flocculating clarifier of the type that has two drive arrangements, one for driving a sludge removal system at the base of the clarifier and the other for driving a stirring arrangement inside a flocculation well of the clarifier.

Flocculating clarifiers are well known to the prior art. In general, such clarifiers include a peripheral wall and base that together form a liquid containing volume. Solids containing influent is pumped into the clarifier, into an open bottom flocculation well mounted in a central upper portion of the clarifier. Solids or sludge which settle out of the influent are collected for removal from the base by means of one or more rotating arms. Clarified effluent is removed via an effluent conduit such as a weir.

In the past, two separate drive arrangements have been provided, one for the sludge collecting arms and the other for stirring blades of the flocculation well. Each drive arrangement has included its own speed reduction unit mounted at the level of the drive arrangement. When two drive arrangements are stacked in this manner, a number of problems are encountered. First, the overall height of the unit is relatively high, which can create an undesirably high minimum height for any cover. Second, the lower of the two speed reduction units may be difficult to reach for maintenance.

It is an object of this invention to provide an improved dual concentric drive arrangement for such a flocculating clarifier that minimizes overall height requirements while providing excellent maintenance access to both speed reduction units.

SUMMARY OF THE INVENTION

The drive system of this invention is included in a clarifier of the type comprising a peripheral wall and a base which define the liquid containing volume. A flocculation well is mounted within the volume, and an influent conduit conducts influent into the flocculation well. Sludge collection means are provided comprising at least one arm mounted for rotation to sweep the base and collect sludge therefrom, and an effluent removal conduit is provided for removing clarified effluent from the volume. The arm is driven in rotation across the base by means of a first output gear coupled to the arm, a first drive gear in meshing engagement with the first output gear, a first speed reduction unit coupled to the first drive gear and situated above the first output gear, and a first motor coupled to drive the first speed reduction unit.

According to this invention, the clarifier further includes a set of stirring blades in the flocculation well, a second output gear coupled to the blades and mounted below the first speed reduction unit, a second drive gear in meshing engagement with the second output gear, a second speed reduction unit coupled to the second drive gear and situated above the second output gear such that both of the speed reduction units are positioned above both of the output gears, and a second motor coupled to drive the second speed reduction unit.

Preferably, the second output gear is larger in diameter than and concentric with the first output gear and the first drive gear is coupled to the first speed reduction unit by means of a drive shaft that passes through a central opening in the second drive gear.

The drive arrangement of this invention allows easy access to both of the speed reduction units for routine maintenance and replacement. In addition, the embodiment described below uses a common housing for both of the output gears, thereby further minimizing overall height and materials requirements.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
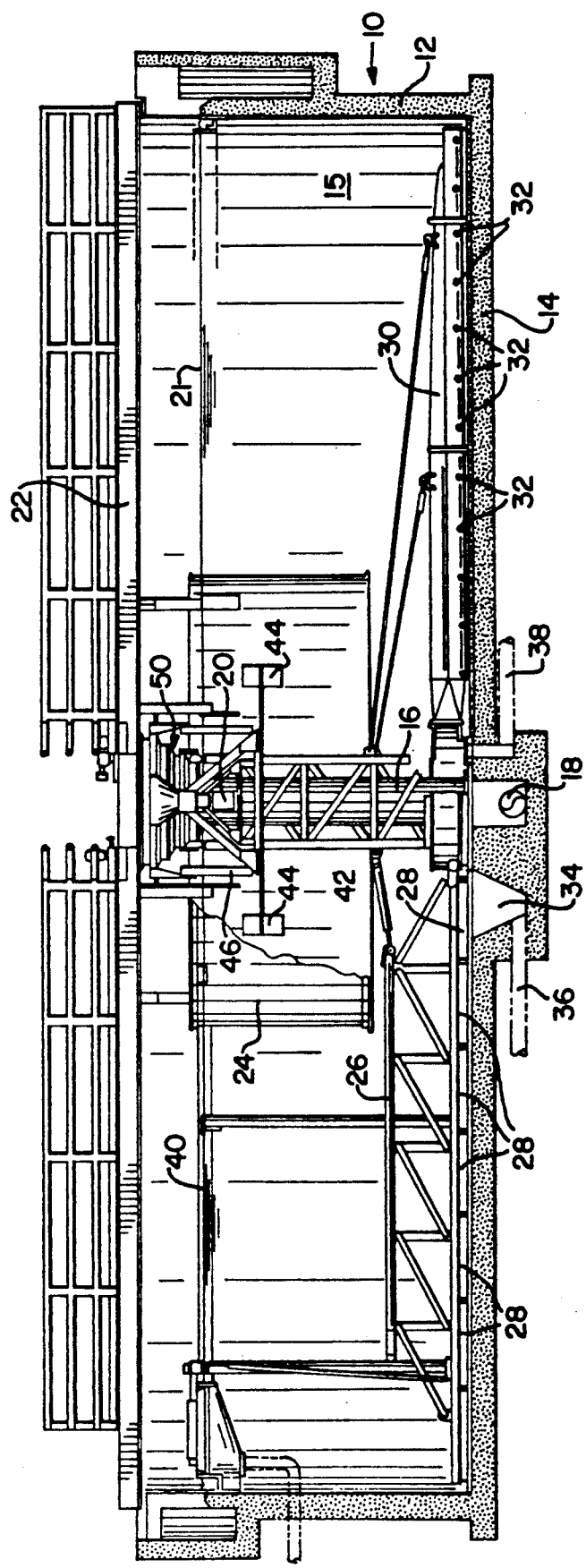
FIG. 1 is a sectional elevational view of a circular clarifier which incorporates a presently preferred embodiment of this invention.

Turning now to the drawings, FIG. 1 shows a circular clarifier 10 which includes a preferred embodiment of the present invention. The clarifier 10 is in large part conventional, and the following discussion will take up first the conventional aspects of the clarifier 10, before turning to a detailed description of the preferred embodiment of the drive system.

The clarifier 10 includes a vertical circular peripheral wall 12 which surrounds a circular base 14. Together, the wall 12 and the base 14 define a liquid containing volume 15, and a column 16 rises vertically from the center of the base 14. An influent conduit 18 supplies influent into a vertical pipe (not shown) at the base of the column 16, and this pipe conducts influent to upper influent ports 20 near the top of the column 16. These upper influent ports 20 are positioned slightly below the liquid level 21 within the volume 15. An access bridge 22 extends diametrically across the peripheral wall 12, and is supported at its central portion by the column 16. A circular flocculating well 24 is suspended from the bridge 22. The well 24 is open at its lower portion, and serves as a partial barrier to the movement of influent radially outwardly.

In use solids in the influent gradually settle to the base 14 where there are collected by a sludge collection means including a scraper arm 26 which includes a plurality of scraper blades 28 oriented to push sludge radially inwardly as the scraper arm 26 rotates about the column 16. Sludge pushed radially inwardly by the scraper blades 28 eventually falls into a sludge removal well 34, where it is drawn out of the clarifier 10 by a drain conduit 36.

The sludge collection means also includes a suction header 30 in the form of a second arm positioned diametrically opposite the scraper arm 26. The suction header 30 defines an array of suction orifices 32 that are connected to a sludge draw off conduit 38. Liquid is allowed to drain out of the clarifier 10 via the sludge draw off conduit 38 at a controlled rate, thereby creating suction in the area of the orifices 32 to remove sludge from the clarifier.

As shown in FIG. 1, a fixed skimmer blade 40 is mounted to the scraper arm 26 to skim floating material from the surface of the liquid in the clarifier 10.

A plurality of flocculation blades 44 are mounted for rotation in the flocculation well 24 to stir the material in the flocculation well 24. The flocculation blades 44 are coupled to an outer drive cage 46 which drives the flocculation blades 44 in rotation. Similarly, the scraper arm 26 and the suction header 30 are connected to an inner drive cage 42. Rotation of the inner drive cage 42 causes the scraper arm 26 and the suction header 30 to move across the base 14 for the sludge removal purposes discussed above. The inner and outer drive cages 42, 46 in this embodiment are vertically oriented and concentric. The foregoing features of the clarifier 10 are conventional, and have been described merely to define the environment of the presently preferred embodiment described below.

Figure 2:
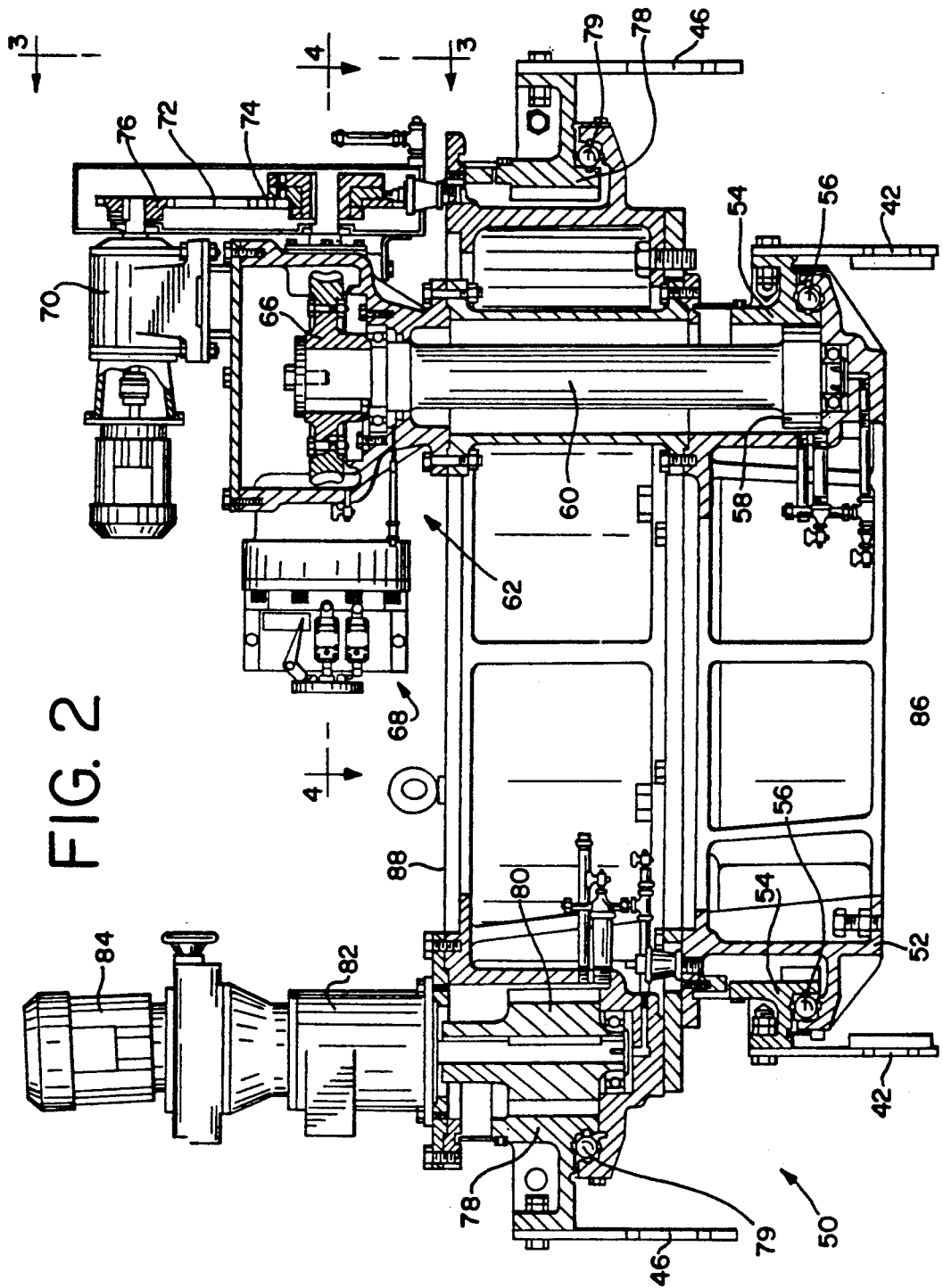
FIG. 2 is a sectional elevational view of the drive arrangement of the embodiment of FIG. 1.
Figure 3:
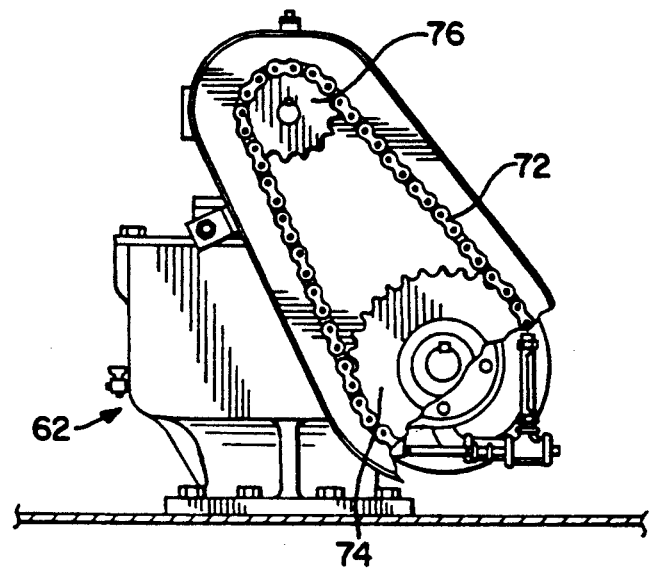
FIG. 3 is a sectional view taken along line 3—3 of FIG. 2.
Figure 4:
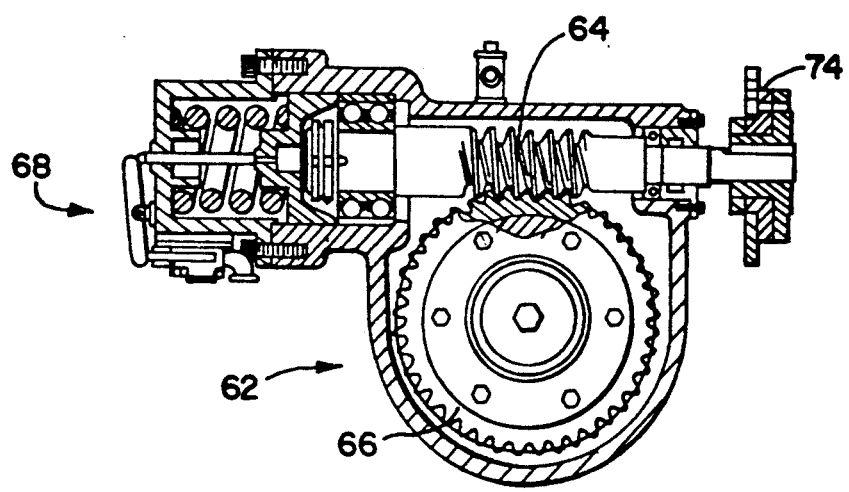
FIG. 4 is a sectional view taken along line 4—4 of FIG. 2.
Figure 5:
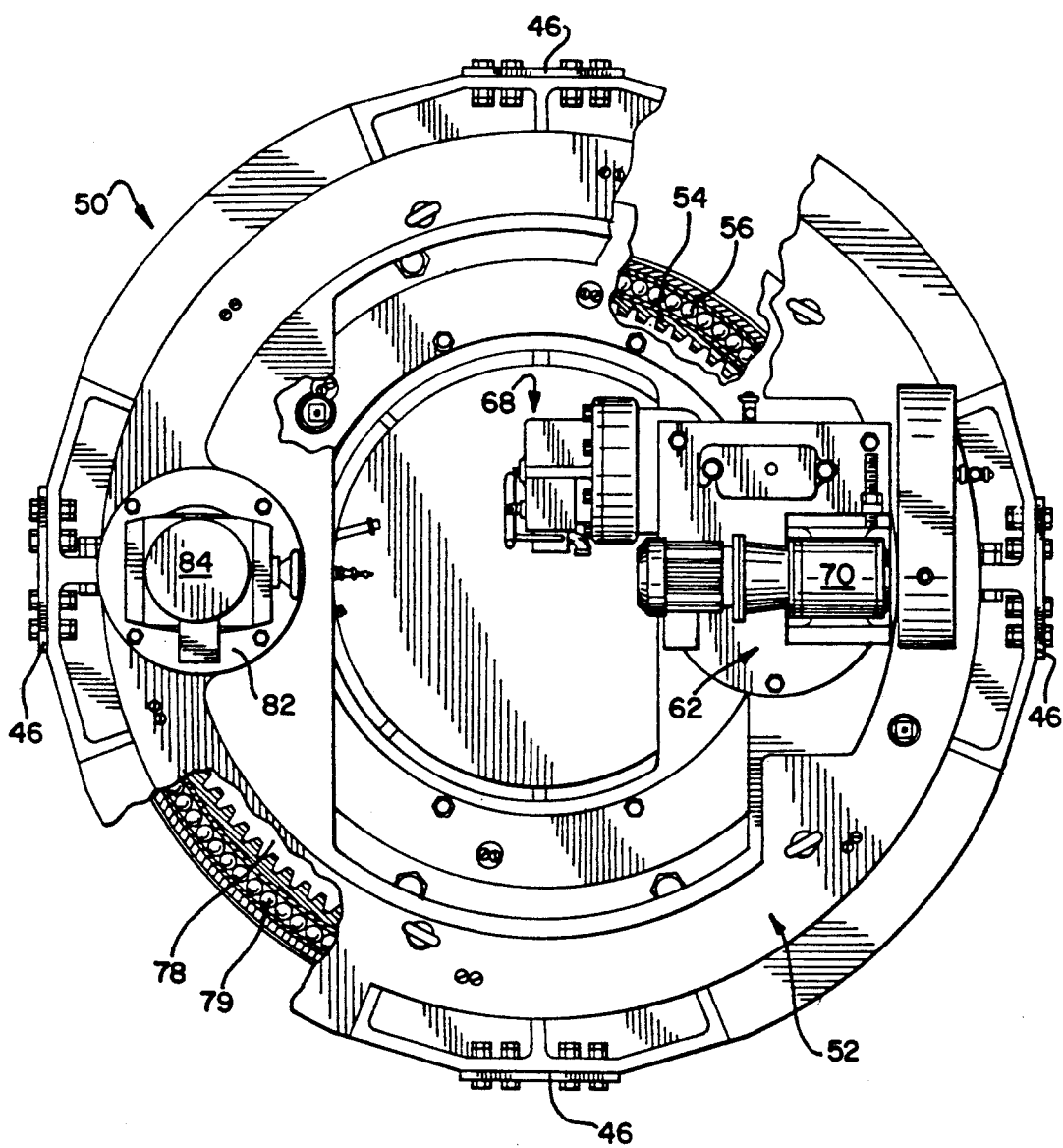
FIG. 5 is a plan view of the drive arrangement of FIG. 2.

According to this invention, the clarifier 10 includes a drive assembly 50 shown in FIGS. 2-5, which includes a housing 52 that rests on top of the column 16. The housing 52 supports a lower output gear 54 for rotation via bearings 56. The lower output gear 54 is an annular gear which defines an inner toothed surface and is connected at its outer annular surface to the inner drive cage 42. The inner annular surface of the lower output gear 54 is driven by a lower drive gear 58 which is mounted for rotation in the housing 52. The lower drive gear 58 is connected to a first speed reduction unit 62 by means of a drive shaft 60. In this embodiment, the speed reduction unit 62 is a conventional worm gear unit which includes a worm gear 66 mounted to the upper end of the drive shaft 60 and a worm 64 (best shown in FIG. 3). One end of the worm 64 is coupled to a load sensing system 68 which is conventional and includes both an indicator and an alarm system for displaying and responding to excessive resistance to rotation of the lower output gear 54. The other end of the worm 64 supports a sprocket 74 which is connected via a drive chain 72 and a sprocket 76 to a drive motor 70 (FIGS. 3 and 4).

As shown in FIG. 2, the housing 52 also supports an upper output gear 78 for rotation, supported on bearings 79. The upper output gear 78 is also annular in shape, and defines an annular inner toothed surface and an outer surface which is connected to the outer drive cage 46. The toothed surface of the upper output gear 78 is driven in rotation by a drive gear 80 that is in turn coupled to a speed reduction unit 82 that is rotated by a motor 84. Preferably, the speed reduction unit 82 is a variable speed reduction system which allows the speed of rotation of the outer drive cage 46 and therefore of the flocculation blades 44 to be adjusted as desired, independently of the speed of rotation of the lower output gear 54.

As best shown in FIG. 2, the housing 52 defines a lower surface 86 which is supported by the column 16, and an upper surface 88. Both of the speed reduction units 62, 82 are mounted to the housing 52 above the upper surface 88. Additionally, both of the motors 70, 84 are mounted above the upper surface 88. This arrangement has been found to provide easy access to both of the speed reduction units 62, 82, thereby facilitating routine maintenance.

As best shown in FIG. 2, both of the output gears 54, 78 are annular, and in both cases the drive gears 58, 80 engage the inner toothed surface of the respective output gear 54, 78. Because the upper output gear 78 is annular, the drive shaft 60 can pass through the central opening in the upper output gear 78. This arrangement further minimizes the overall height of the drive assembly 50.

Of course, it should be understood that various changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

I claim:

1. In a clarifier of the type comprising: a peripheral wall and a base which define a liquid containing volume; a column mounted within the peripheral wall to extend upwardly from the base; a flocculation well mounted in the volume; an influent conduit for conducting influent into the flocculation well; sludge collection means comprising at least one arm mounted for rotation to sweep the base and collect sludge therefrom; an effluent removal conduit for removing clarified effluent from the volume; and means for driving the arm in rotation across the base, said driving means comprising a first output gear coupled to the arm outside the column, a first drive gear in meshing engagement with the first output gear, a first speed reduction unit coupled to the first drive gear and situated above the first output gear, and a first motor coupled to drive the first speed reduction unit; the improvement comprising:

a set of stirring blades in the flocculation well;
   a second output gear coupled to the blades outside the column and mounted below the first speed reduction unit;
   a second drive gear in meshing engagement with the second output gear;
   a second speed reduction unit coupled to the second drive gear and situated above the second output gear such that both of the speed reduction units are positioned above both of the output gears; and
   a second motor coupled to drive the second speed reduction unit;
   wherein both of the output gears are toothed on a respective interior annular surface, and wherein both of the drive gears are positioned within the respective interior annular surface;
   wherein the first and second output gears are rotatably mounted in a housing which defines an upper surface, wherein the first and second drive gears are rotatably mounted in the housing, wherein the first and second speed reduction units are mounted on the upper surface of the housing, and wherein the housing is supported on the column.

2. The invention of claim 1 wherein the second output gear is larger in diameter than and concentric with the first output gear, and wherein the second output gear is mounted above the first output gear.

3. The invention of claim 1 wherein the first drive gear is coupled to the first speed reduction unit by a first drive shaft, wherein the second output gear is annular and defines a central opening, and wherein the first drive shaft passes through the central opening of the second drive gear.

4. The invention of claim 3 wherein the first output gear is coupled to the arm by a first drive cage, wherein the second output gear is coupled to the blades by a second drive cage, wherein the first drive cage is positioned within and concentric with the second drive cage, and wherein the first and second drive cages are positioned outside the column.

5. The invention of claim 1 wherein both of the output gears are supported by respective bearings, and wherein both of the bearings are disposed radially outwardly of the respective drive gear.

* * * * *